J. DIERKS.
STOCK FEEDER.
APPLICATION FILED APR. 24, 1920.

1,365,385.  Patented Jan. 11, 1921.

INVENTOR.
JOHN DIERKS.
BY A. B. Bowman
ATTORNEY

UNITED STATES PATENT OFFICE.

JOHN DIERKS, OF SHREVEPORT, LOUISIANA.

STOCK-FEEDER.

1,365,385. Specification of Letters Patent. Patented Jan. 11, 1921.

Application filed April 24, 1920. Serial No. 376,385.

*To all whom it may concern:*

Be it known that I, JOHN DIERKS, a citizen of the United States, residing at Shreveport, in the parish of Caddo and State of Louisiana, have invented certain new and useful Improvements in Stock-Feeders, of which the following is a specification.

My invention relates to stock feeders for automatically feeding animals more particularly adapted for feeding hogs and the objects of my invention are: First, to provide a stock feeder in which the feed hopper member is suspended relatively to a base member so that the animal may swing the hopper relatively to the base member in feeding thereby causing the feed to feed down into troughs on the sides so that the animals may readily procure the food from the troughs; second, to provide a feeder of this class which is suspended on two crank shafts positioned on opposite sides of said hopper member near the lower side thereof; third, to provide a stock feeder of this class with agitating means adjacent the feed outlet between the hopper and the base portion which is partially revolved by the oscillation of the hopper on its supports; fourth, to provide a feeder of this class in which the hopper moves up and down as well as sidewise by pressure of the animal's nose against said hopper and fifth, to provide a feeder of this class which is very simple and economical of construction, effective in its action and in which the food will not pack but will feed readily into the troughs with the pressure of the animal's nose against the hopper and which will not readily deteriorate or get out of order.

Figure 1:
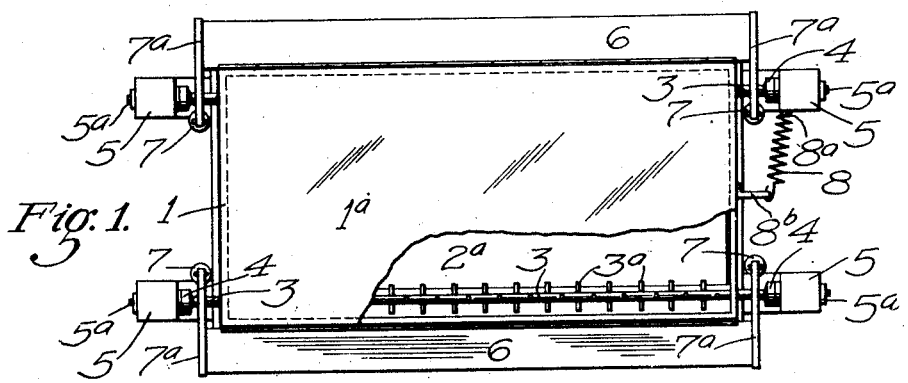
Figure 2:
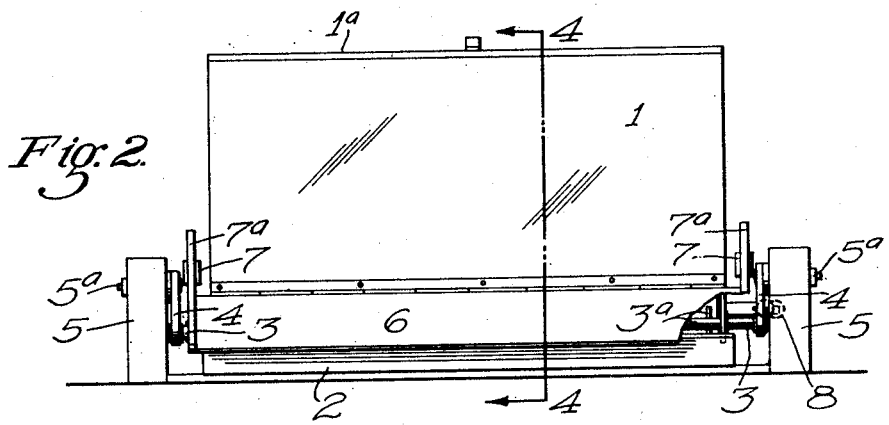
Figures 3, 4:
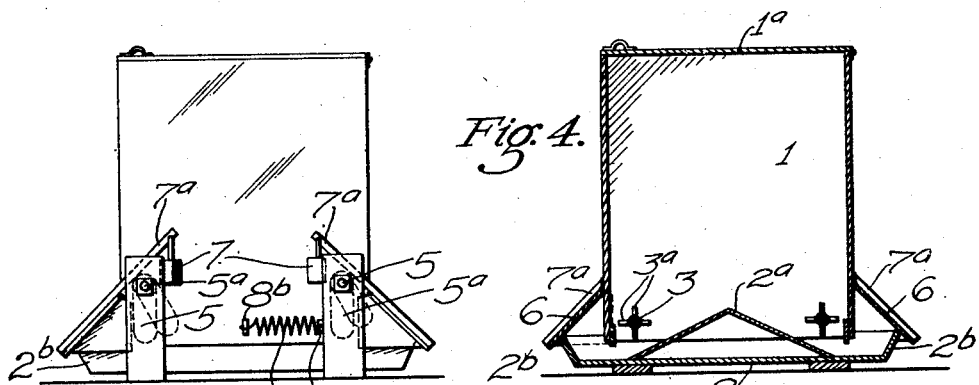

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a top or plan view of my feeder showing a portion broken away to facilitate the illustration; Fig. 2 is a side elevational view thereof showing a portion broken away; Fig. 3 is an end elevational view and showing by dotted lines varying positions of the cranks and Fig. 4 is a transverse sectional view through 4—4 of Fig. 2.

Similar characters of reference refer to similar parts and portions throughout the several views of the drawings.

The hopper 1, base 2, shafts 3, cranks 4, uprights 5, lids 6, weights 7 and spring 8 constitute the principal parts and portions of my stock feeder. The hopper 1 is a box shaped member open at its lower side and provided with a lid $1^a$ on its upper side to facilitate the placing of food in the hopper. Mounted in this hopper near the lower side and extending through the ends thereof near the opposite sides are shafts 3 which are provided on the inside of said hopper with a plurality of radiating arms $3^a$ forming agitating members for agitating the food when the shaft 3 is partially revolved. These shafts extend out through the ends of the hopper and are journaled in said ends and on their outwardly extended ends are secured crank members 4, the opposite ends of which are mounted on bolts $5^a$ secured in the uprights 5 thus providing for the oscillation of the shafts 3 on bolts $5^a$. These uprights 5 are positioned at the ends forming supports so that the shafts 3 may oscillate thereon thus providing a sidewise and up and down movement of the hopper with the shifting of the hopper by pressure of the nose of the animal. Mounted below this hopper member is the base member 2 which is stationary. It is provided with an inverted V shaped upwardly extended portion $2^a$ which forms inclined surfaces to facilitate the movement of the food outwardly. The outer sides of this base member 2 extend outwardly past the sides of the hopper and are provided with angled portions $2^b$ forming troughs on opposite sides of the hopper for the animals to feed from. These troughs are covered by means of lids 6 pivoted on the sides of the hopper and extended some distance past the edge of the trough portions $2^b$ so that they cover the trough at all times with the shifting of the hopper relatively to the trough. These lids 6 are counter-balanced by means of weights 7 which are suspended on extended arms $7^a$ extending past the ends of the hopper. Secured to one of the uprights 5 by means of a lug $8^a$ in a spring 8 and its other end is secured to a lug $8^b$ secured to the hopper which tends to prevent too much shifting of the hopper.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with this construction there is provided a stock feeder which is mounted upon cranks positioned at opposite sides of the ends of a hopper providing slight sidewise and up and down movement of the hopper relative to a stationary base; that the shafts upon which the cranks are mounted are provided with radially extending arms which partially revolve with the movement of the shaft on the cranks thus providing for agitation of the food adjacent its exit from the hopper into the trough portions of the base.

Having thus described my invention what I claim as new and desire to secure by Letters Patent is:

1. A stock feeder, including a stationary base member provided with trough portions on opposite sides and with an inclined bottom inclining toward said trough on opposite sides, a hopper pivotally mounted upon shafts near the lower outer sides of said hopper and cranks secured to the extending ends of said shafts pivotally mounted on uprights adjacent the ends of said hopper.

2. A stock feeder, including a stationary base member provided with trough portions on opposite sides and with an inclined bottom inclining toward said trough on opposite sides, a hopper pivotally mounted upon shafts near the lower outer sides of said hopper, cranks secured to the extending ends of said shafts pivotally mounted on uprights adjacent the ends of said hopper and lids pivotally mounted on said hopper extending over the edge of the trough portions of said base member.

3. A stock feeder, including a stationary base member provided with trough portions on opposite sides and with an inclined bottom inclining toward said trough on opposite sides, a hopper pivotally mounted upon shafts near the lower outer sides of said hopper, cranks secured to the extending ends of said shafts pivotally mounted on uprights adjacent the ends of said hopper, lids pivotally mounted on said hopper extending over the edge of the trough portions of said base member and means for counter-balancing said lids.

4. A stock feeder, including a stationary base member provided with trough portions on opposite sides and with an inclined bottom inclining toward said trough on opposite sides, a hopper pivotally mounted upon shafts near the lower outer sides of said hopper, cranks secured to the extending ends of said shafts pivotally mounted on uprights adjacent the ends of said hopper, a spring connecting one of said uprights with the hopper and means secured on said shafts for agitating the food in said hopper.

5. A stock feeder, including a base member provided with an extended trough portion, a hopper mounted on crank shafts over said base member whereby it moves upwardly and sidewise by side pressure on said hopper with the movement of said shafts.

6. A stock feeder, including a base member provided with an extended trough portion, a hopper mounted on crank shafts over said base member whereby it moves upwardly and sidewise by side pressure on said hopper and means mounted on said shafts for agitating the food in said hopper with the movement of said shafts.

In testimony whereof, I have hereunto set my hand at Shreveport, Louisiana, this 31st day of March, 1920.

JOHN DIERKS.